Sept. 21, 1926.
A. B. BEDFORD
1,600,269
HARROW
Filed Dec. 22, 1924       3 Sheets-Sheet 3
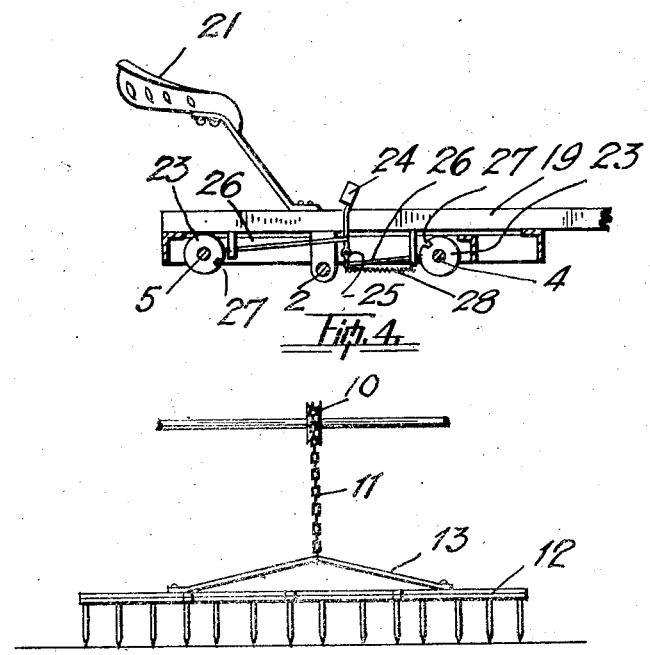
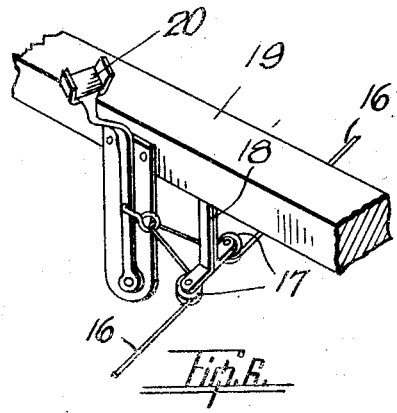
INVENTOR
AUGUSTINE B BEDFORD
BY Patented Sept. 21, 1926.

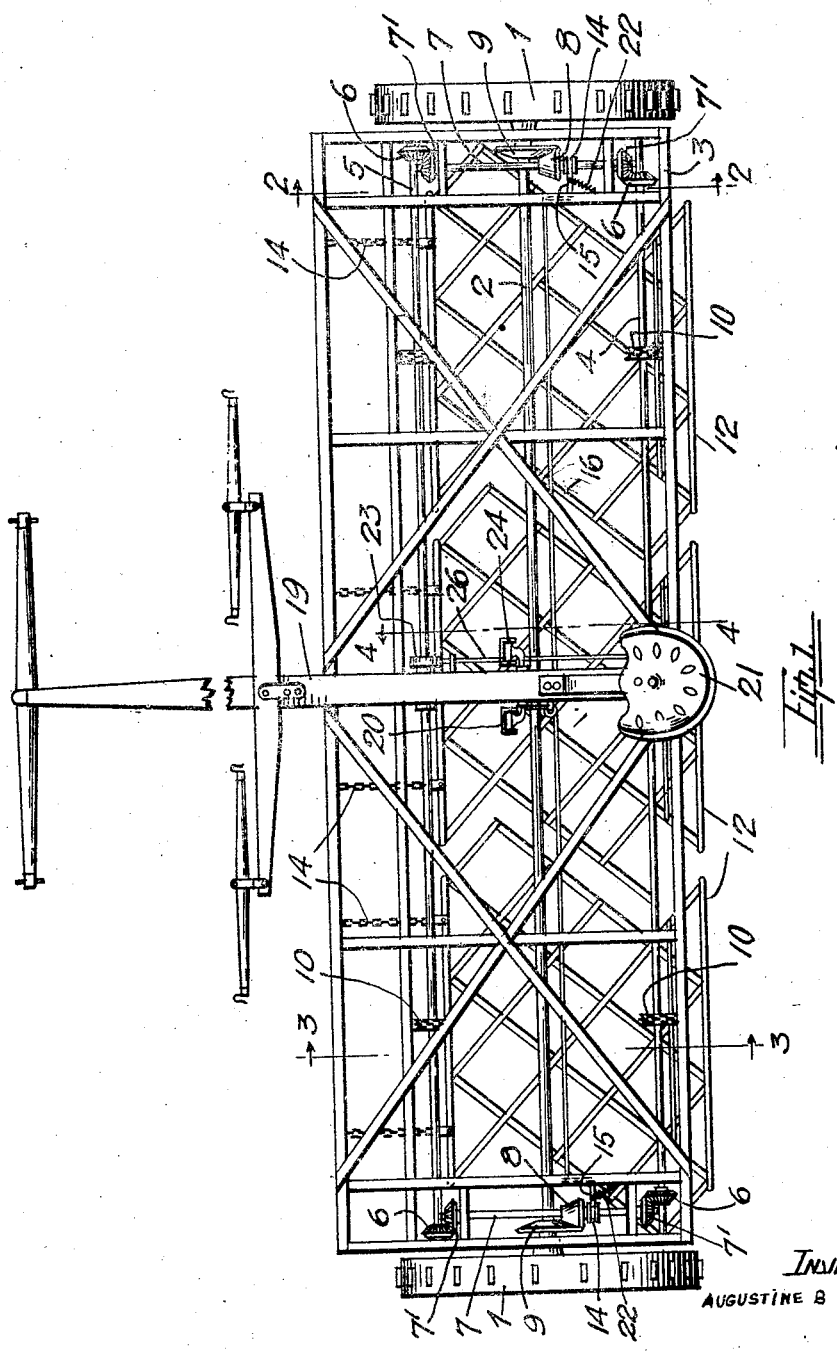

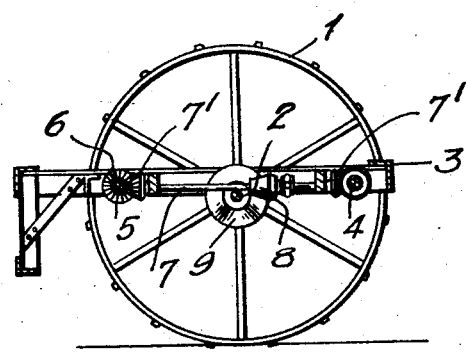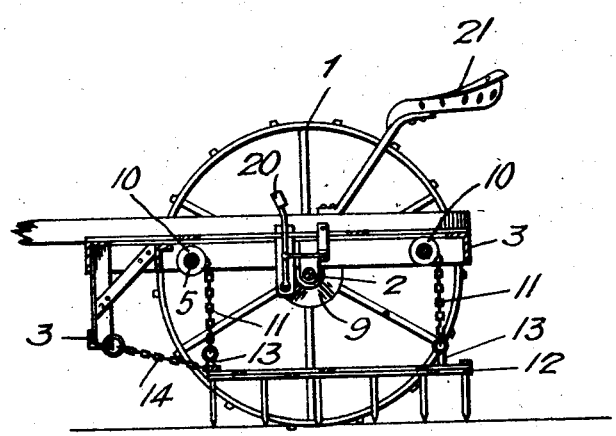

1,600,269

UNITED STATES PATENT OFFICE.

AUGUSTINE BARTHOLOMEW BEDFORD, OF ROSSENDALE, MANITOBA, CANADA.

HARROW.

Application filed December 22, 1924. Serial No. 757,416.

My invention relates to harrows and my object is to provide an implement of this character having a wheeled frame from which the harrow sections may be suspended when not in use and when so suspended may be easily transported from place to place. When the harrow had to be transferred from field to field or across railway tracks etc., it has been necessary to dismantle it and load the sections on a wagon or other vehicle for transportation and on reaching the place of use to reassemble the sections. This involved considerable labor and loss of time. I overcome these defects by having the sections of the harrow flexibly connected to a wheeled frame and providing means driven from the wheels for lifting the sections clear of the ground and locking them in this position. A further advantage of this construction is that the harrow sections may be lifted from time to time during use and teeth cleaned thus reducing the spread of noxious weeds.

In the accompanying drawings forming part of this specification;—

Fig. 1 is a plan view of my improved implement.

Fig. 2 is a sectional view on line 2—2 of Fig. 1 looking in the direction of the arrows.

Fig. 3 is a section on line 3—3 of Fig. 1.

Fig. 4 is a section on line 4—4 of Fig. 1 looking in the direction of the arrows.

Fig. 5 is a detail of the lifting means at one end of a harrow section.

Fig. 6 is a detail of the clutch operating means.

My invention relates to harrows and comprises a pair of wheels and a connecting axle with a rigid frame mounted thereon. Rotatable shafts are mounted at the front and rear of this frame and these shafts are driven by suitable mechanism from the wheels of the frame. The sections of the harrow are flexibly connected to these shafts whereby when the shafts are rotated the flexible connections are wound thereon and the harrow sections are lifted from the ground. A driver's seat is mounted on the frame and means are provided for causing the shafts to be rotated and for locking them against rotation when the sections have been lifted from the ground.

Referring to the drawings wherein similar numerals of reference designate similar parts 1 indicates the wheels, 2 the axle and 3 the frame mounted thereon. The axle is shown as extending from end to end of the frame but it will be readily understood that two short axles may be used. The frame is formed of angle iron preferably for the sake of lightness and strength and may be of any preferred form. Mounted in this frame at the front and rear and extending longitudinally thereof are the shafts 5 and 4 adapted to rotate in bearings in the ends of the frame 3. On each of these shafts at opposite ends thereof is fixed a bevel wheel 6 adapted to rotate with the shaft. Disposed transversely of the frame at opposite ends thereof are the shafts 7 having bevel gears 7' adapted to mesh with the bevel wheels 6 on the shafts 4 and 5. Slidably mounted on the shafts 7 and adapted to rotate therewith are the beveled friction wheels 8 which in operative position functionally engage the friction wheels 9 fixedly secured to the traction wheels 1. It will be observed that the bevel wheels on the shaft 5 mesh with the bevel gear 7', on the side of the gear opposite to that which the bevel wheel 6 meshes with the other bevel gear 7' in order to have the shafts 4 and 5 rotate in the same direction. Fixed to the shafts 4 and 5 at spaced intervals are chain or lift wheels 10. The number of these wheels on each shaft corresponds with the number of sections in the harrow and are here shown as three. Chains 11 for a purpose now to be described are secured to the wheels.

The harrow comprises any preferred number of sections 12, in the drawings shown as three and may be of the usual construction. To the front and rear of each section is attached by bolts or otherwise the suspension rod 13 to which is secured the free end of the chain 11. To secure each section of the harrow to the frame and to provide a proper disposition thereof draft chains 14 are secured to the front portion of the frame 3 and to the front of each harrow section. See especially Fig. 3. This provides a flexible connection between the frame and the harrow sections and permits the latter to accommodate themselves to the inequalities of the ground.

From this construction it will be seen that on the rotation of the traction wheels 1 the shafts 7 will be rotated through the medium of the friction wheels 8 and 9 and this rotation will be transmitted to the shafts 4 and 5 and thus to the lift wheels 10 through the bevel gears 6 and 7' thus raising the harrow clear off the ground.

In order to raise and lower the harrow at will I provide means under the control of the driver for throwing the friction wheel 8 into engagement with the wheel 9. These means comprise spaced collars 14 secured to the wheel 8 and adapted to slide with it. Pivotally mounted in the frame 3 is a bell crank lever 15 one arm of which engages the spaced collars while the other through the medium of a flexible cable 16 passing over the antifriction rollers 17 on the brackets 18 rigidly secured to the tongue 19 and is secured to the foot lever 20. This lever is within easy reach of the driver's foot as he occupies the seat 21 mounted on the tongue. To disengage the wheels 8 and 9 I provide the spring 22 connecting the bell crank 15 to the frame 3 and normally holding the wheels 8 and 9 out of engagement.

In moving the implement from place to place it is desirable to lock the harrow in its raised position. To accomplish this I provide notched disks 23 fixed to the shafts 4 and 5 adjacent the tongue. A foot lever 24 is pivoted to the frame at 25 and on opposite sides of said pivot point. The locking rods or plungers 26 are pivotally connected to the lever 24 and are adapted in operative position to engage the notches 27 in the disks 23. A spring 28 securing the lower end of the lever 24 to the frame is adapted normally to hold the locking rods in operative position. When said rods 26 are withdrawn and the shafts and disks rotated the rods 26 ride on the peripheries of the disks.

The operation of the lifting and locking mechanism is as follows:—When the driver desires to raise the harrows from the ground he presses on the foot lever 20 and this movement through the cables 16 actuates the bell cranks 15 at opposite ends of the frame to shift the friction wheels 8 into engagement with the wheel 9 and thus rotate the shafts 4 and 5 and thus raise the harrow by means of the wheels 10 and chains 11. The disks 23 rotate with the shafts 4 and 5 and as the plungers 26 ride on the peripheries of said disks under the influence of the spring 28 they drop into the notches 27 when the harrow has reached the desired height and thus lock the harrow at the desired height.

From the foregoing it will be seen that I have devised a light but strong and durable frame from which the harrow may be suspended when being transferred from field to field or from farm to farm and which will permit of its being easily cleaned during use without the great loss of time and labor hitherto involved. It is to be understood that various changes in the details of construction may be made without departing from the spirit of my invention and that I desire to avail myself of all such changes as come within the scope of the appended claims.

What I claim and desire to secure by Letters Patent is:—

1. A harrow comprising a frame having longitudinal shafts at the front and rear thereof said shafts having gears at their opposite ends, transverse shafts at opposite ends of the frame having gears meshing with the gears on the longitudinal shafts, traction wheels supporting said frame, harrow sections flexibly connected to said longitudinal shafts and means for rotating said transverse shafts from the traction wheels, substantially as described.

2. A harrow of the kind described comprising a frame having longitudinal shafts at front and rear having bevel gears at their opposite ends, transverse shafts at opposite ends of the frame having gears meshing with the gears on the longitudinal shaft, traction wheels supporting the frame harrow sections flexibly connected to the frame and to the longitudinal shafts, gears for rotating said transverse shaft from the traction wheel and means for normally holding such gears out of engagement, substantially as described.

3. A harrow comprising a frame having longitudinal shafts at the front and rear thereof, said shafts having bevel gears at their opposite ends, transverse shafts at the opposite ends of the frame having gears meshing with the gears on the longitudinal shafts, traction wheels supporting said frame, harrow sections flexibly connected to the longitudinal shafts, means for driving the transverse shaft from the traction wheels comprising fixed and slidable gears on the traction wheel and shaft respectively and means for holding the said gears in inoperative relation, substantially as described.

4. A harrow comprising a frame having longitudinal rotatable shafts at the front and rear thereof, traction wheels supporting said frame, harrow sections flexibly connected to said frame and to said shafts, means for driving said shafts, from the traction wheels and means operated from the driver's seat to throw said driving means into engagement, substantially as described.

5. A harrow comprising a frame having longitudinal shafts at the front and rear thereof, traction wheels supporting said frame, harrow sections flexibly connected to said frame and to said shafts means for driving said shafts at will from the traction wheels to raise the harrow sections, means to lock said sections in raised position and means under the control of the driver to cause the engagement of said driving means, substantially as described.

6. A harrow comprising a frame having longitudinal shafts at the front and rear thereof, traction wheels supporting said frame, harrow sections flexibly suspended from said shafts, means for driving said shafts at will from the traction wheels to raise the harrow sections, notched disks carried by said shafts, locking rods adapted to engage said notches to secure said shafts against movement, and means for actuating said locking rods.

In testimony whereof I affix my signature.

AUGUSTINE BARTHOLOMEW BEDFORD.